(12) United States Patent
Khamnualthong et al.

(10) Patent No.: US 11,386,922 B1
(45) Date of Patent: Jul. 12, 2022

(54) MULTIPLE PROTECTIVE FILM ON NEAR-FIELD TRANSDUCER OF HEAT-ASSISTED MAGNETIC RECORDING DEVICE

(71) Applicant: Western Digital Technologies, Inc., San Jose, CA (US)

(72) Inventors: Nattaporn Khamnualthong, Nonthaburi (TH); Krisda Siangchaew, Nonthaburi (TH)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/345,634

(22) Filed: Jun. 11, 2021

(51) Int. Cl.
| | |
|---|---|
| *G11B 11/105* | (2006.01) |
| *G11B 5/31* | (2006.01) |
| *G11B 5/60* | (2006.01) |
| *G11B 5/39* | (2006.01) |
| *G11B 13/08* | (2006.01) |
| *G11B 5/40* | (2006.01) |
| *G11B 5/00* | (2006.01) |

(52) U.S. Cl.
CPC ............ *G11B 5/314* (2013.01); *G11B 5/3906* (2013.01); *G11B 5/40* (2013.01); *G11B 5/6088* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,705,325 B2 | 4/2014 | Matsumoto | |
| 8,705,327 B2 | 4/2014 | Matsumoto | |
| 8,902,720 B1 * | 12/2014 | Schreck | G11B 5/314 369/13.33 |
| 9,036,307 B1 * | 5/2015 | Hoshiya | G11B 5/6088 360/313 |
| 9,412,402 B2 | 8/2016 | Cheng et al. | |
| 9,552,833 B2 | 1/2017 | Cheng et al. | |
| 9,659,587 B1 | 5/2017 | Khamnualthong et al. | |
| 10,002,626 B1 * | 6/2018 | Cheng | G11B 5/6088 |
| 10,083,713 B1 * | 9/2018 | Simmons | G11B 5/6088 |
| 10,614,850 B1 | 4/2020 | Jones et al. | |
| 10,748,561 B1 * | 8/2020 | Hwang | G11B 5/4826 |
| 11,127,421 B1 * | 9/2021 | Siangchaew | G11B 5/6088 |

(Continued)

*Primary Examiner* — Tan X Dinh

(74) *Attorney, Agent, or Firm* — Patterson + Sheridan, LLP; Steven H. Versteeg

(57) ABSTRACT

A heat-assisted magnetic recording (HAMR) head has a protective multilayer confined to a window of the disk-facing surface of the slider that surrounds the near-field transducer (NFT) end and write pole end. The protective multilayer is made up of a first film of silicon nitride directly on and in contact with the NFT end and the write pole end and a second film of a metal oxide on and in contact with the silicon nitride film. The silicon nitride film is preferably formed by RIBD but is thin enough so that it does not contain any significant amount of other compounds. The metal oxide is preferably silicon dioxide, or alternatively an oxide of hafnium, tantalum, yttrium or zirconium, and together with the silicon nitride film provides a protective multilayer of sufficient thickness to be optically transparent to radiation and resistant to thermal oxidation.

14 Claims, 7 Drawing Sheets

(56) References Cited

U.S. PATENT DOCUMENTS

| | | | |
|---|---|---|---|
| 2016/0035379 A1* | 2/2016 | Cheng | G11B 5/3136 369/13.33 |
| 2021/0118469 A1* | 4/2021 | Khamnualthong | G11B 5/8408 |

* cited by examiner

MULTIPLE PROTECTIVE FILM ON NEAR-FIELD TRANSDUCER OF HEAT-ASSISTED MAGNETIC RECORDING DEVICE

TECHNICAL FIELD

This invention relates generally to a heat-assisted magnetic recording (HAMR) disk drive, in which data are written while the magnetic recording layer on the disk is at an elevated temperature, and more specifically to an improved HAMR write head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording layer, located a subwavelength distance from the first element. A head carrier or slider supports the NFT and the write head, with the NFT and write pole having ends located at the surface of the slider that faces the recording layer. A protective slider overcoat is formed on the recording-layer-facing surface over the NFT and write pole ends and serves as the gas-bearing surface (GBS) of the slider. The slider also supports the read head and rides above the disk surface on a cushion of gas, which is typically air or helium.

NFTs are typically formed of a low-loss metal (e.g., Au, Ag, Al, Cu) shaped in such a way to concentrate surface charge motion at a notch or tip located at the slider GBS when light is incident. Oscillating tip charge creates an intense near-field pattern that heats the recording layer on the disk. The magnetic write pole is then used to change the magnetization of the recording layer while it cools. Sometimes the metal structure of the NFT can create resonant charge motion (surface plasmons) to further increase intensity and disk heating. For example, when polarized light is aligned with an E-antenna type of NFT, an intense near field pattern is created at the notch or tip of the E-antenna. Resonant charge motion can occur by adjusting the E-antenna dimensions to match a surface plasmon frequency to the incident light frequency. A NFT with a generally triangular output end, sometimes called a "nanobeak" type of NFT, is described in U.S. Pat. No. 8,705,325 B2 and U.S. Pat. No. 8,705,327 B2. In this type of NFT an evanescent wave generated at a surface of the waveguide couples to surface plasmons excited on the surface of the NFT and a strong optical near-field is generated at the apex of the triangular output end.

SUMMARY

It has been discovered that the reliability of the NFT is much worse under actual recording conditions on a disk than under similar optical power in vacuum or ambient air conditions. This may be due to degradation or oxidation of the protective slider overcoat, which is formed of amorphous diamond-like carbon (DLC). It may also be due to "back-heating" of the NFT because of slider-disk frictional heating, conduction from the disk and/or the accumulation of carbonaceous material near the NFT. To address this problem, a protective layer confined to a window of the recording-layer-facing surface has been proposed to cover the NFT end. Because the NFT end and write pole end are so near to each other the write pole end must also be located in the window region and protected by the protective layer. U.S. Pat. No. 8,902,720 B1, assigned to the same assignee as this application, describes a HAMR write head with a protective layer in the window region formed of various oxides or nitrides. U.S. Pat. No. 10,083,713, assigned to the same assignee as this application, describes a HAMR write head with a protective multilayer of alternating films of a metal and diamond-like carbon (DLC).

Because the window protective layer covers both the NFT end and write pole end it must have not only the required optical transparency but also thermal oxidation resistance to prevent oxidation of the write pole ferromagnetic material. As a result of testing various materials as part of this invention, it has been discovered that the optimal window protective layer is preferably a single layer of pure silicon nitride ($Si_3N_4$). Pure silicon nitride has the best combination of optical transparency and thermal oxidation resistance to serve as the HAMR optical window material. Any inclusion of compounds other than silicon nitride within the optical window will degrade its optical transparency and thermal oxidation resistance. The silicon nitride protective layer for the optical window is deposited by reactive ion-beam deposition (RIBD) from a silicon target in a $Ar+N_2$ plasma. However, the RIBD process requires extremely low chamber pressure, especially the oxygen partial pressure, to maximize the amount of silicon nitride content within the layer. Otherwise, any residual gas in the chamber will react with the sputtering target surface and/or freshly deposited film surface to convert them to other than non-$Si_3N_4$ compounds. The silicon nitride layer is preferably at least 2.5 nm thick to provide the necessary protection. However, conventional sputtering systems can make only very thin pure silicon nitride layers, typically less than about 1-2 nm. At thicknesses greater than about 1 nm, the layers start to be made up of other materials like Si-Ox-Ny, and at about 2 nm thickness the other materials may make up about 50% of the layer material.

U.S. Pat. No. 10,614,850 B1 describes a process for forming a dielectric coating on the NFT by coating the disk with a liquid solution and then performing a HAMR write operation. The dielectric coating can be a combination of two or more oxides and nitrides from a list of 13 oxides and nitrides that includes silicon nitride and silicon dioxide. U.S. Pat. No. 9,412,402 B2 describes a gas barrier bilayer of a first oxide layer like AlO, MgO or BeO on the NFT, a second oxide or nitride layer, that may be SiO or SiN from a list of 32 oxides and nitrides, on the first layer, and wherein a protective wear resistant layer is located on the second layer.

Embodiments of this invention protect the NFT and write pole ends with a protective multilayer confined to a window of the disk-facing surface of the slider that surrounds the NFT and write pole ends. The protective multilayer comprises a first film of silicon nitride directly on and in contact with the NFT end and the write pole end and a second film of a metal oxide on and in contact with the silicon nitride film. The silicon nitride film is preferably formed by RIBD but is thin enough so that it does not contain any significant amount of other compounds. The metal oxide is preferably a silicon oxide (SiOx) like silicon dioxide, or alternatively an oxide of hafnium, tantalum, yttrium or zirconium, and together with the silicon nitride film provides a protective multilayer of sufficient thickness. The window protective multilayer is transparent to radiation at the wavelength of the laser and is resistant to oxidation at high temperature and in the presence of oxygen and moisture. The slider protective overcoat in the non-window region is typically DLC formed on an adhesion film on the slider's recording-layer facing surface. The window protective multilayer on the NFT provides sufficient protection so that no separate protective overcoat, like DLC, is required on top of the multilayer.

For a fuller understanding of the nature and advantages of the present invention, reference should be made to the following detailed description taken together with the accompanying figures.

DETAILED DESCRIPTION

Figure 1:
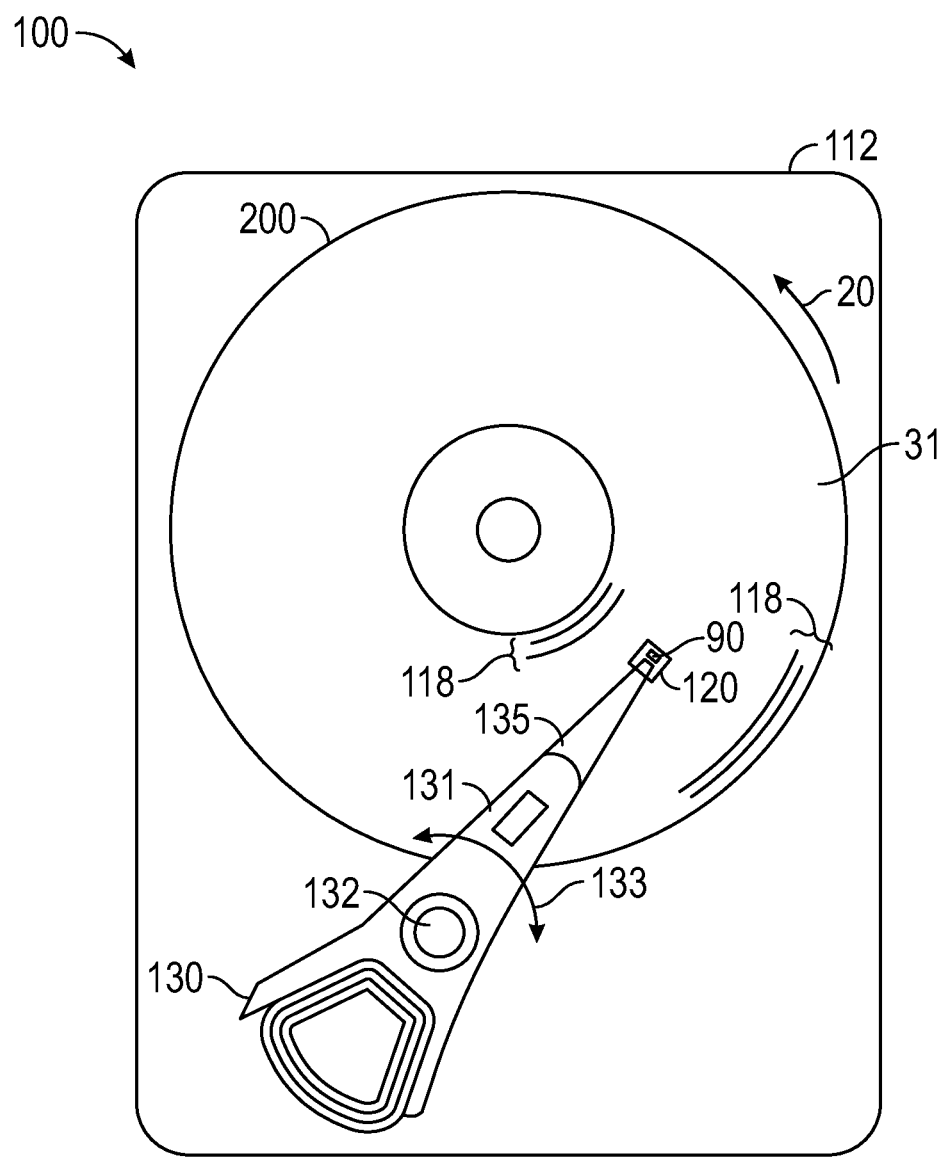
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor (not shown) for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing, typically air or helium, generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
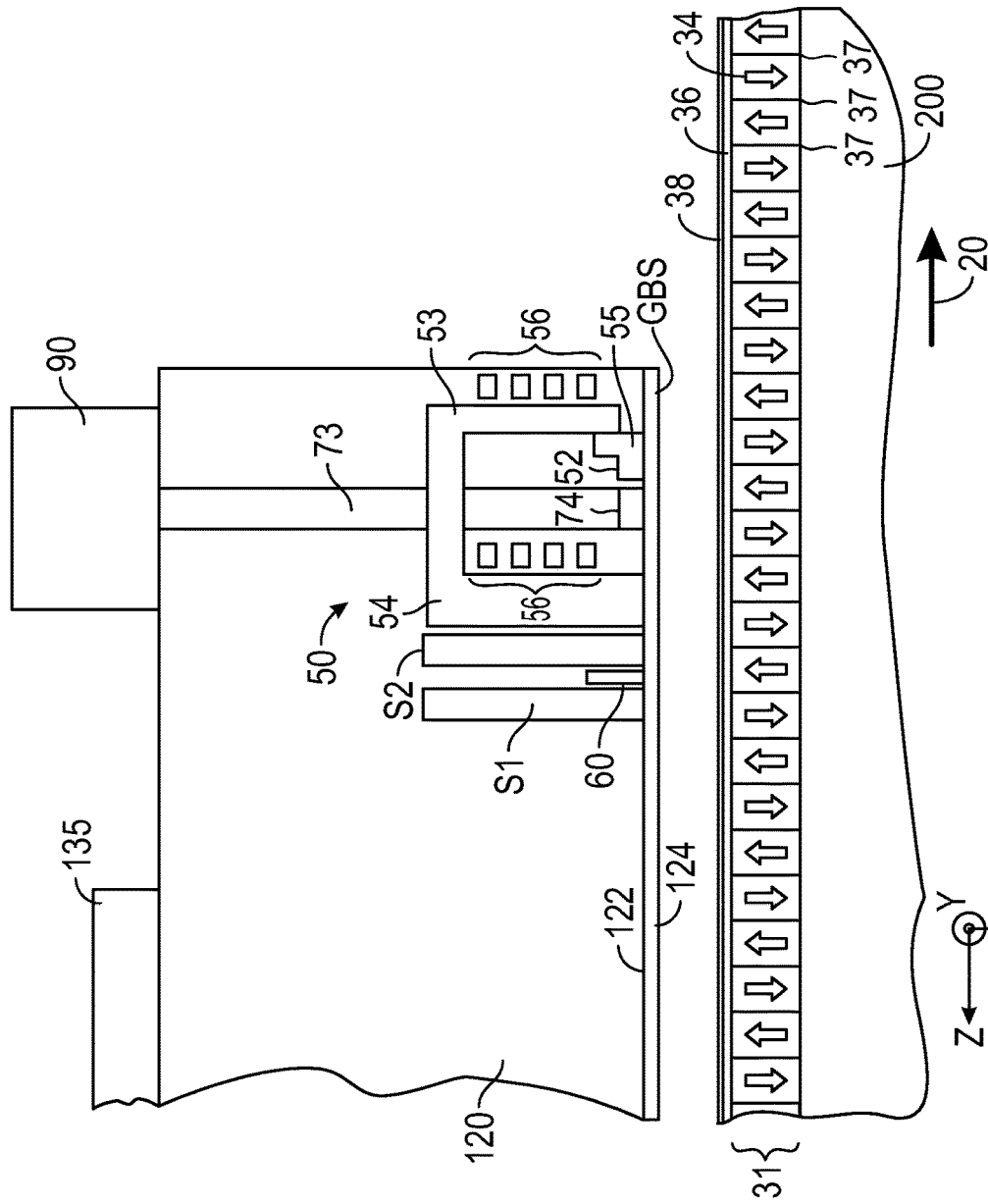
FIG. 2 depicts a sectional view, not drawn to scale because of the difficulty in showing the very small features, of a gas-bearing slider for use in HAMR disk drive and a portion of a HAMR disk according to the prior art.

In the following drawings, the X direction denotes a direction perpendicular to the gas-bearing surface (GBS) of the slider, the Y direction denotes a track width or cross-track direction, and the Z direction denotes an along-the-track direction. FIG. 2 is a schematic cross-sectional view illustrating a configuration example of a HAMR head according to the prior art, which is also capable of functioning as the HAMR head in embodiments of this invention. In FIG. 2, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluropolyether (PFPE).

The gas-bearing slider 120 is supported by suspension 135. The slider 120 has a recording-layer-facing surface 122 onto which an overcoat 124 is deposited. The overcoat 124 is typically a DLC overcoat whose outer surface forms the GBS of the slider 120. An optional adhesion undercoat (not shown), such as a silicon (Si) or a silicon nitride (SiNx) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. The waveguide 73 that delivers light to NFT 74 is preferably a single-mode waveguide.

The reliability of the NFT is much worse under actual recording conditions on a disk than under similar conditions in vacuum or ambient air. This is believed to be due to accelerated oxidation of the slider DLC overcoat due to the high gas pressure (20 or more atmospheres) generated at the GBS by the high disk rotational speed (5-15 kRPM), or by "back-heating", i.e., heating of the NFT because of slider-disk frictional heating, conduction from the disk and/or the accumulation of opaque carbonaceous material near the NFT. Back-heating can cause diffusion of the NFT metal until the NFT tip rounds and recording degrades.

Figure 3A:
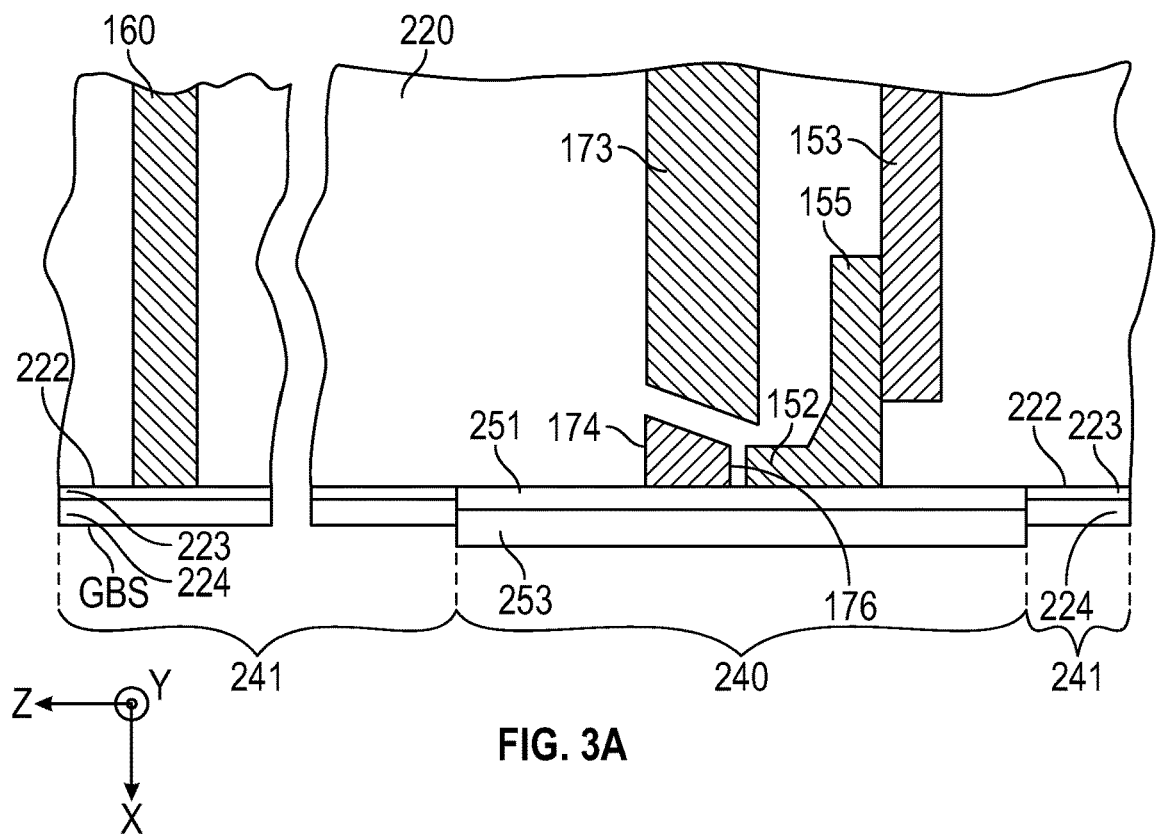
FIG. 3A is a cross-sectional view of a portion of the slider and FIG. 3B is a gas-bearing surface (GBS) view of the slider with the protective multilayer on a window region of the disk-facing surface of the slider according to an embodiment of the invention.
Figure 3B:
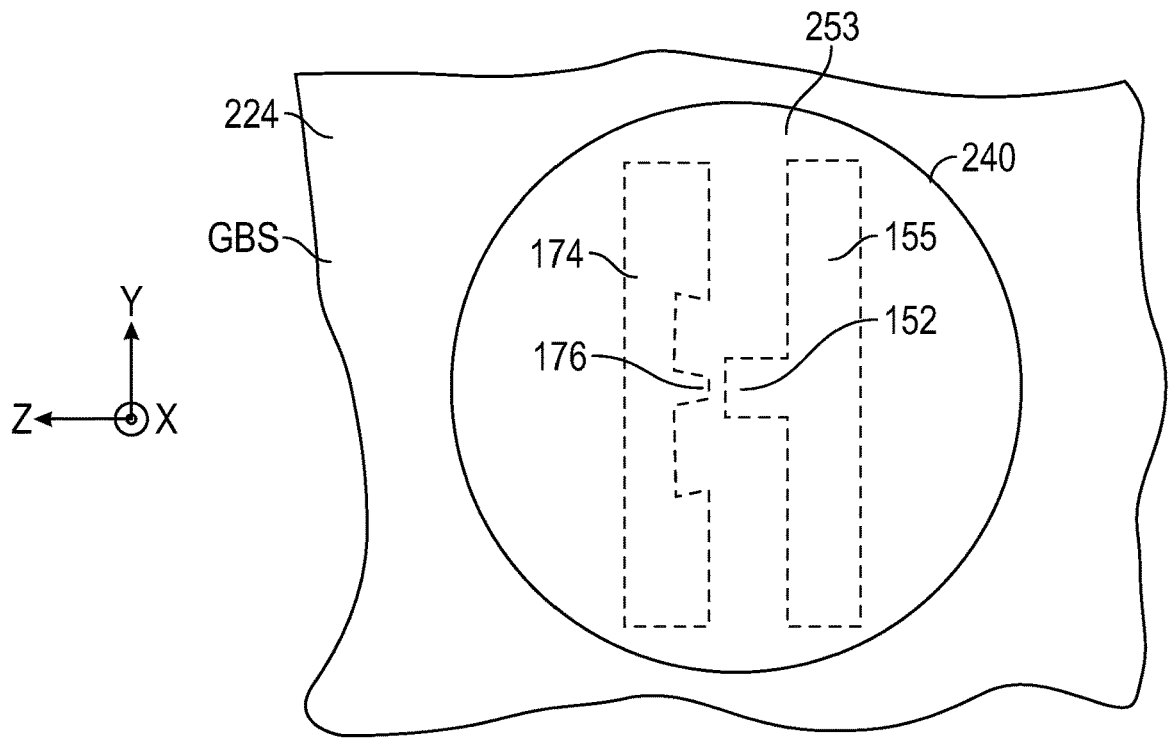

In embodiments of this invention the HAMR write head has a window protective multilayer made up of a first film of silicon nitride directly on and in contact with the NFT end and the write pole end and a second film of a metal oxide directly on and in contact with the silicon nitride film. FIG. 3A is a cross-sectional view of a portion of the slider and FIG. 3B is a GBS view of the slider according to an embodiment of the invention. The slider 220 has a surface 222 that faces the recording layer on the disk. The slider supports the waveguide 173, NFT 174, main pole 153 and write pole 155 with write pole end 152. The NFT 174 in this example is an E-antenna with a central tip 176 that faces the write pole end 152. In this example the write pole end 152 is a lip that extends from the write pole 155 at the disk-facing surface 222. The disk-facing surface 222 includes a window region 240 (FIG. 3B) that surrounds both the NFT 174 and write pole end 152. The slider protective overcoat 224, which is typically DLC, is formed on the disk-facing surface 222 only in the non-window region 241 outside the window region 240. The magnetoresistive read head 160 is located in the non-window region 241 in the down-track Z direction from the write pole 155. An undercoat or adhesion film 223, such as a silicon (Si) or a silicon nitride (SiNx) film, functions to improve the adhesion of the protective overcoat 224. The adhesion film 223 has a typical thickness of 0.2-0.5 nm and the DLC overcoat 224 has a typical thickness in the range of 1.5-2.5 nm. The protective multilayer 250 is formed on the disk-facing surface 222 only in the window region 240 and includes the silicon nitride film 251 and metal oxide film 253. The thickness of the protective multilayer (the combined films 251 and 253) is at least 2.5 nm and preferably in the range of 3-5 nm. A separate protective overcoat, like overcoat 224, is not required to be formed on the metal oxide film 253 of the multilayer.

Figure 4A:
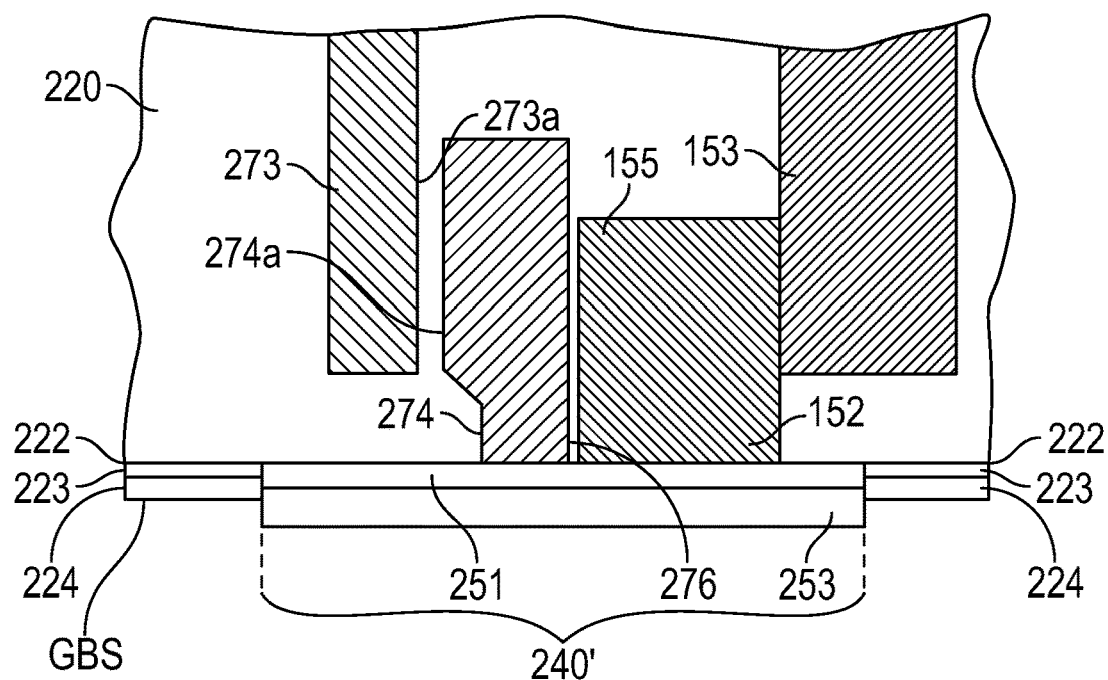
FIG. 4A is a cross-sectional view of a portion of the slider and FIG. 4B is a GBS view of the slider with the protective multilayer on a window region of the disk-facing surface of the slider according to an embodiment of the invention wherein the near-field transducer (NFT) is a "nanobeak" type NFT with a triangular end with an apex of the triangle forming the NFT tip that faces the write pole end.
Figure 4B:
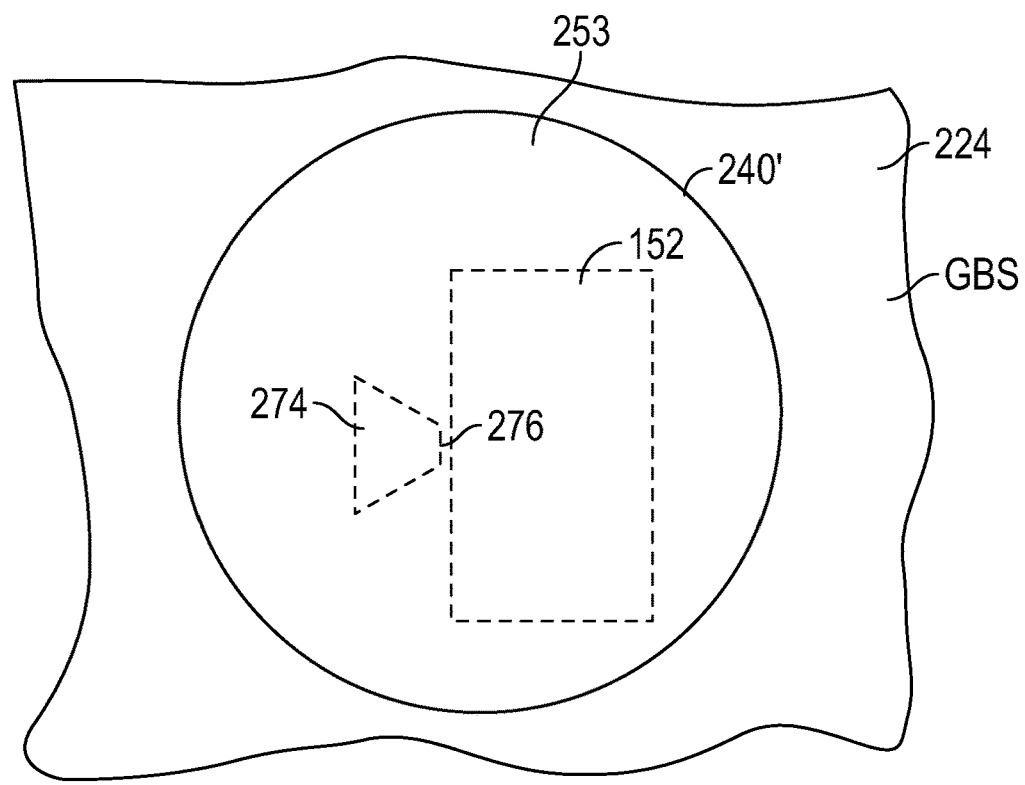

FIGS. 4A-4B illustrate an embodiment wherein the NFT 274 is a "nanobeak" type NFT with a triangular end with an apex of the triangle forming the NFT tip 276 that faces the write pole end 152. In this example, the write pole end 152 does not extend as a lip from the write pole 155. In this type of NFT, the waveguide 273 has a surface 273a that faces a surface 274a of NFT 274. When light is introduced into the waveguide 273, an evanescent wave is generated at the surface 273a and couples to surface plasmons excited on the surface 274a of NFT 274. The surface plasmons propagate to the output tip 276. The protective multilayer of silicon nitride film 251 and metal oxide film 253 is formed on the slider protective overcoat 224 only in the window region 240' that surrounds the NFT 274 end and write pole end 152.

In all embodiments, the window is depicted as being circular but could have other shapes, provided it covers both the NFT and write pole ends. Preferably the window would not be so large as to also cover the read head (item 160 in FIG. 3A). If circular, it could, for example, have a diameter of approximately 3 which would not affect the read head that is typically about 5 μm from the write pole end.

Figure 5A:
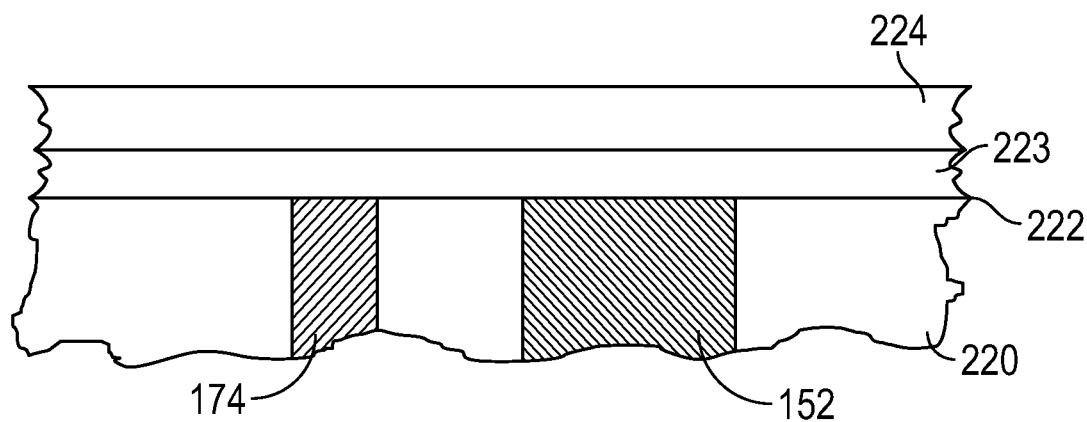
FIGS. 5A-5E are sectional views illustrating the basic process steps in forming the protective multilayer according to an embodiment of the invention.
Figure 5B:
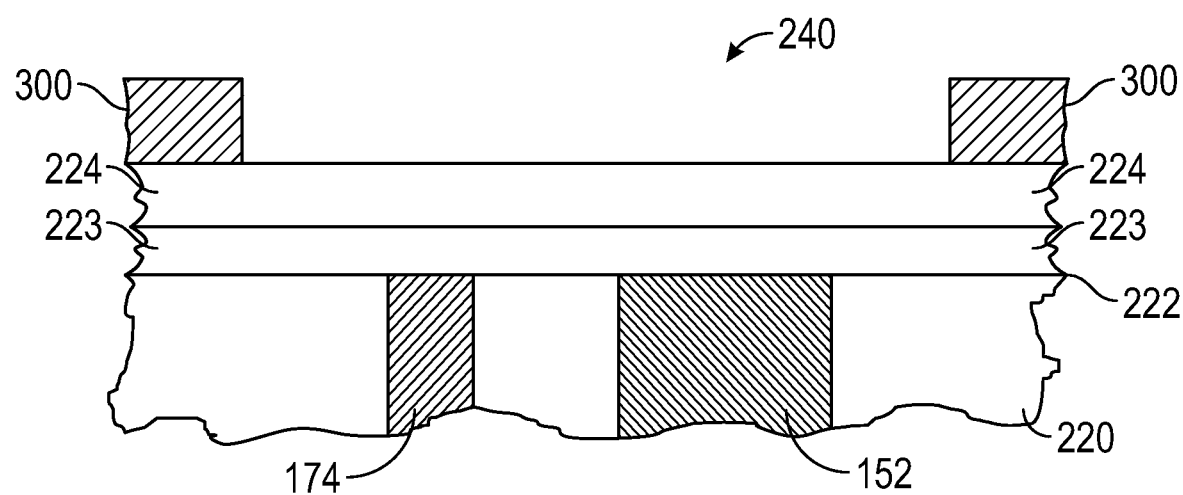
Figure 5C:
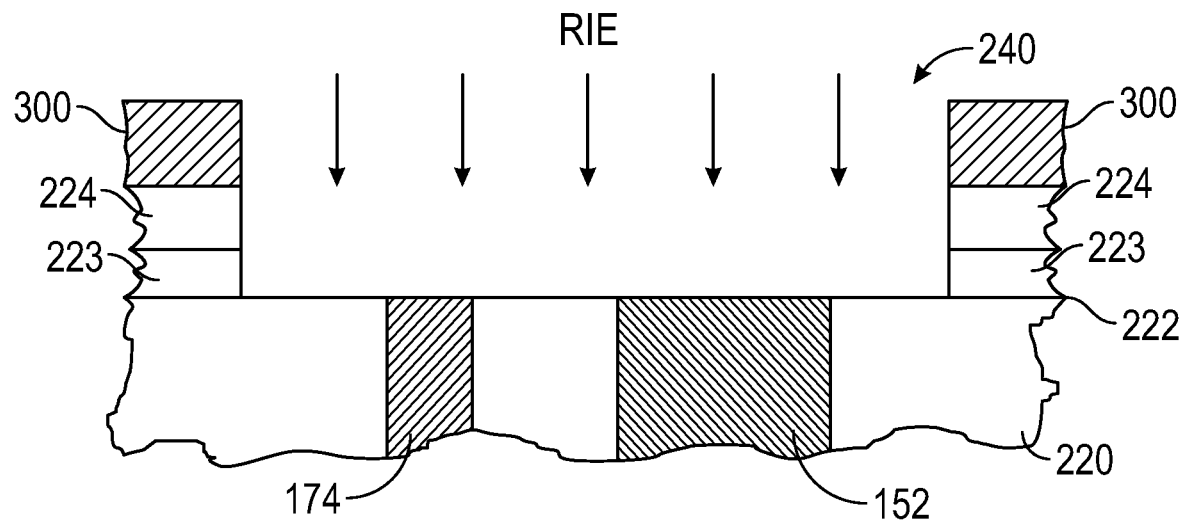

FIGS. 5A-5E are sectional views illustrating the basic process steps in forming the protective multilayer according to an embodiment of the invention. In FIG. 5A, an adhesion film 223 and an amorphous DLC overcoat 224 have been deposited over the entire surface 222 of slider 220. The adhesion film 223 may have a thickness between about 0.2-0.5 nm and the DLC overcoat 224 may have a thickness between about 1.5-2.5 nm. In FIG. 5B, a resist 300 has been patterned and developed on overcoat 224 to define the window region 240 that surrounds NFT end 174 and write pole end 152. The resist may be a liquid resist deposited by spin-coating. In FIG. 5C, the adhesion film 223 and slider overcoat 224 in window region 240 are removed, for example by reactive ion etching (RIE) in an Ar—N$_2$ atmosphere. Because the etch rates of the undercoat 223 and overcoat 224 material are well known, the etching can be terminated at the precise time to remove the overcoat 224 material and all of the adhesion film 223 without etching any of the NFT 174 material (which is typically Au or a Au alloy) or write pole 152 material (which is typically a CoFe or CoFeNi alloy).

Figure 5D:
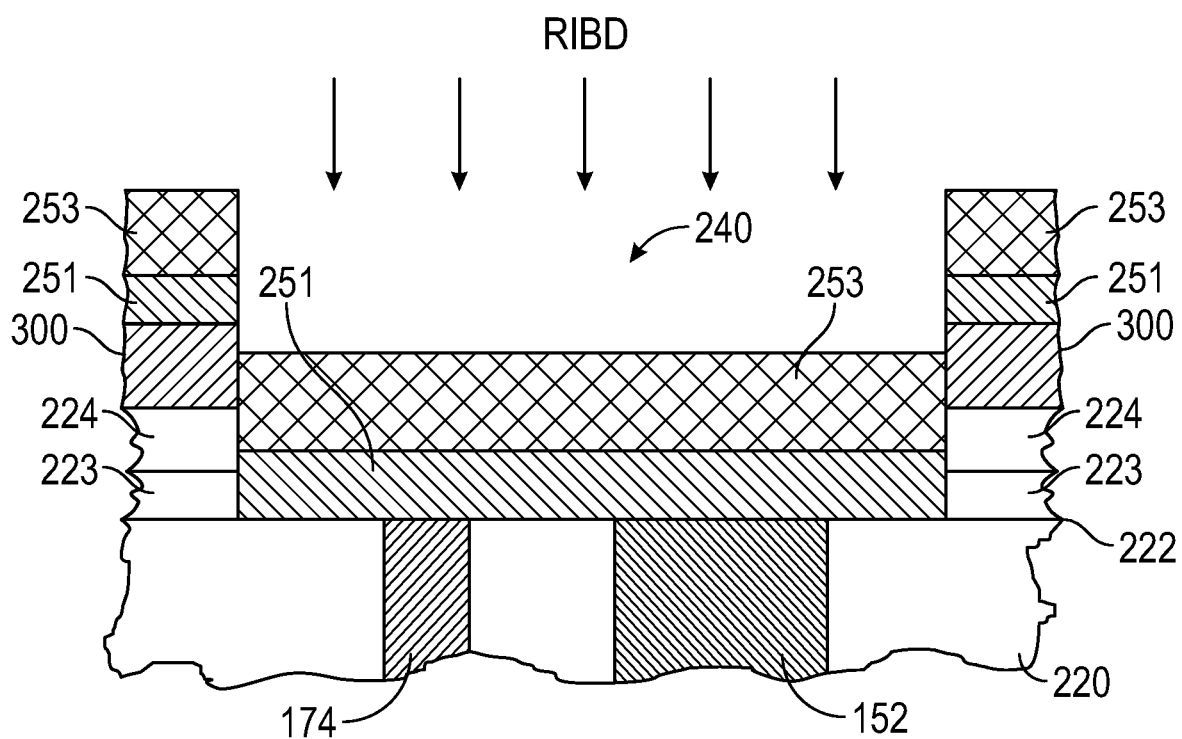

Next, in FIG. 5D, the first film of the protective layer, the silicon nitride film 251 consisting essentially of Si$_3$N$_4$, is deposited in window region 240 directly on NFT end 174 and write pole end 152. The deposition of film 251 is preferably by RIBD from a Si target in an Ar+N$_2$ plasma. Alternatively, the film 251 may be deposited by ion beam deposition (IBD) from a Si$_3$N$_4$ target in an Ar atmosphere. The silicon nitride film is deposited to a thickness of at least 0.5 nm, but not to exceed about 2.0 nm, to assure it does not contain an unacceptable amount of material other than pure silicon nitride. Then the second film 253, the metal oxide film, which is preferably silicon dioxide, is deposited by RIBD directly on the silicon nitride film 251 from a Si target in an Ar+O$_2$ plasma. Alternatively, the second film may be an oxide selected from hafnium oxide, tantalum oxide, yttrium oxide and zirconium oxide. The metal oxide is deposited to a thickness to assure that the total thickness of the multilayer is at least 2.5 nm, preferably in the range of about 3-5 nm, to assure adequate protection.

Figure 5E:
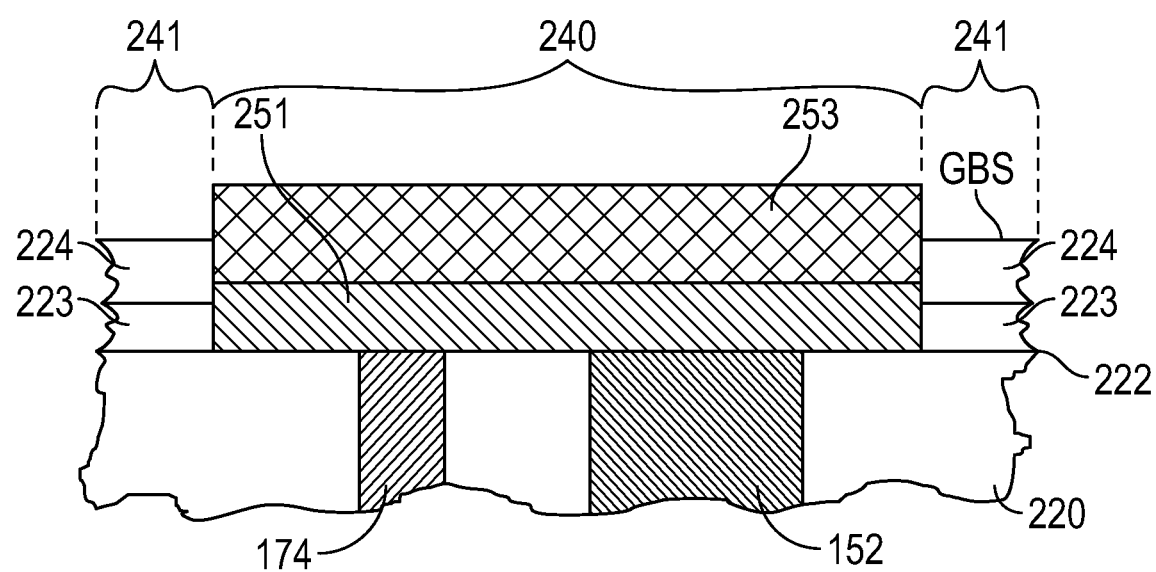

In FIG. 5E, the resist 300 and overlying silicon nitride and silicon dioxide material have been removed. The protective multilayer of films 251 and 253 in the window region 240 is depicted as extending beyond the GBS of slider 220, which is the outer surface in the non-window region.

In one embodiment of the method an optional surface treatment can be performed on the surface of the silicon dioxide film. The silicon dioxide film surface can be subjected to a plasma consisting essentially of one of carbon tetrafluoride ($CCl_4$), nitrogen ($N_2$), and a mixture of nitrogen and hydrogen ($N_2+H_2$).

In all embodiments it is important that the silicon nitride film be the first film and the silicon dioxide film, or other metal oxide film, be the second film. If the order of the films is reversed, the NFT and write pole will become oxidized and deform. This is because to fabricate the silicon dioxide film with good stoichiometry and good optical transparency it is deposited using RIBD with argon-oxygen plasma. It has been discovered that the silicon nitride should be at least 0.5 nm thick to avoid NFT and write pole oxidation during the subsequent silicon dioxide deposition.

Table 1 shows the optical performance as measured by the Attenuated Total Reflectance (ATR) method for similar thicknesses of a single silicon nitride layer and the multilayer according to embodiments of the invention. Surface plasmon propagation coefficient (Gspp) describes the amount of light loss (dB) per distance traveled (μm). The extinction coefficient k is a measure of light absorption. The $Si_3N_4/SiO_2$ multilayers exhibited lower Gspp and k values, which signifies a more optically transparent layer, for both the 25 Å and 40 Å thick layers.

TABLE 1

| Protective layer | Thickness (Å) | Gspp (dB/μm) | k |
|---|---|---|---|
| Single layer $Si_3N_4$ | 25 | 0.266 | 0.331 |
| | 50 | 0.278 | 0.152 |
| $Si_3N_4/SiO_2$ Multilayer | 25 (10Å/15Å) | 0.211 | 0.162 |
| | 40 (20Å/20Å) | 0.248 | 0.109 |

The resistance to thermal oxidation for the multilayers was tested on Ni28Fe72 coupons with various $Si_3N_4/SiO_2$ multilayer thicknesses. The coupons were subjected to 300° C. in oven at ambient atmosphere. After a specified annealing time they were removed from the oven and analyzed with Raman spectroscopy to test for Fe oxide formation. The data showed that a 20 Å $Si_3N_4$/10 Å $SiO_2$ multilayer provides thermal oxidation protection equivalent to a single 30 Å $Si_3N_4$ layer, where the time to detect the Fe oxide peak was greater than 10 hours.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer, the head comprising:
    a head carrier having a surface for facing a recording layer;
    a write pole on the head carrier and having an end at the recording layer facing surface;
    an optical waveguide on the head carrier for receipt of laser radiation;
    a near-field transducer (NFT) on the head carrier for optical coupling with the waveguide, the NFT having an output end at the recording layer facing surface;
    wherein the recording layer facing surface of the head carrier comprises a window region surrounding the NFT output end and write pole end, and a non-window region; and
    a protective multilayer on the NFT output end and write pole end, the protective multilayer consisting of a silicon nitride film on and in contact with the NFT end and write pole end and an oxide film on and in contact with the silicon nitride film, the oxide being selected from an oxide of silicon, hafnium, tantalum, yttrium and zirconium.

2. The HAMR head of claim 1 wherein the oxide film consists of silicon dioxide.

3. The HAMR head of claim 1 wherein the protective multilayer has a thickness of at least at least 2.5 nm.

4. The HAMR head of claim 1 wherein the silicon nitride film has a thickness in a range of 0.5 nm to 2.0 nm.

5. The HAMR head of claim 1 further comprising a protective overcoat on the recording layer facing surface only in the non-window region.

6. The HAMR head of claim 5 wherein the overcoat comprises diamond-like carbon (DLC).

7. The HAMR head of claim 5 further comprising an adhesion film in contact with the recording layer facing surface in the non-window region, wherein the protective overcoat is in contact with the adhesion film.

8. The HAMR head of claim 1 wherein the NFT output end at the recording layer facing surface is formed as an E-antenna having a center output tip that faces the write pole.

9. The HAMR head of claim 1 wherein the NFT output end at the recording layer facing surface is formed as a nanobeak antenna having a generally triangular shaped output tip with an apex of the triangular shaped output tip facing the write pole.

10. A heat-assisted recording (HAMR) disk drive comprising:
    the HAMR head of claim 1;
    a magnetoresistive read head on the head carrier having an end in the non-window region;
    a laser for directing light to the waveguide; and
    a magnetic recording disk having a magnetic recording layer.

11. A slider for a heat-assisted magnetic recording (HAMR) disk drive, the slider having a substrate surface and comprising:
    a near-field transducer (NFT) having an output end at the substrate surface;
    a film consisting of a silicon nitride on and in contact with the NFT output end; and
    a film consisting of silicon dioxide on and in contact with the silicon nitride film.

12. The slider of claim 11 wherein the silicon nitride film and silicon dioxide film have a combined thickness of at least 2.5 nm.

13. The slider of claim 11 wherein the silicon nitride film has a thickness in a range of 0.5 nm to 2.0 nm.

14. The slider of claim 11 further comprising a write pole having an end at the substrate surface, wherein the silicon nitride film is also on and in contact with the write pole end and the silicon dioxide is also on and in contact with the silicon nitride film on the write pole end.

* * * * *